United States Patent [19]

Gössler

[11] 4,349,726

[45] Sep. 14, 1982

[54] CONTROL DEVICE FOR ELECTRIC HEATING APPARATUS

[75] Inventor: Gerhard Gössler, Oberderdingen, Fed. Rep. of Germany

[73] Assignee: E.G.O. Electro-Geräte Blanc und Fischer, Fed. Rep. of Germany

[21] Appl. No.: 215,429

[22] Filed: Dec. 11, 1980

[30] Foreign Application Priority Data

Dec. 20, 1979 [DE] Fed. Rep. of Germany ....... 2951334

[51] Int. Cl.³ .............................................. H05B 1/02
[52] U.S. Cl. .................................... 219/511; 219/492; 219/494; 219/508; 219/510; 307/97; 337/42; 337/85; 337/100; 337/102
[58] Field of Search ............... 219/494, 492, 493, 507, 219/508, 509, 511, 512, 510; 307/96, 97; 337/37, 42, 51, 85, 89, 92, 93, 100, 101, 102, 105

[56] References Cited

U.S. PATENT DOCUMENTS 3,587,023  6/1971  Goessler et al. .................... 219/511
3,588,448  6/1971  Ziver .................................. 219/511
4,214,151  7/1980  Kicherer et al. .................... 219/511

FOREIGN PATENT DOCUMENTS 2347045  3/1975  Fed. Rep. of Germany ...... 219/492

Primary Examiner—B. A. Reynolds
Assistant Examiner—M. H. Paschall
Attorney, Agent, or Firm—Steele, Gould & Fried

[57] ABSTRACT

The control device has a power regulator for the timed power to the heating system of the electrical apparatus. The heating system is provided with a temperature sensor which, up to a given desired temperature, bridges the power regulator with the aid of a temperature switch, so that full power is supplied to the electrical apparatus heating system. On exceeding the desired temperature, power is supplied to the electrical apparatus via the power regulator.

The temperature sensor is additionally heatable by an auxiliary heating system to obtain a variable change-over temperature of the temperature switch (22).

The auxiliary heating system is preferably always switched on when the heating system of the power regulator is switched off.

10 Claims, 5 Drawing Figures

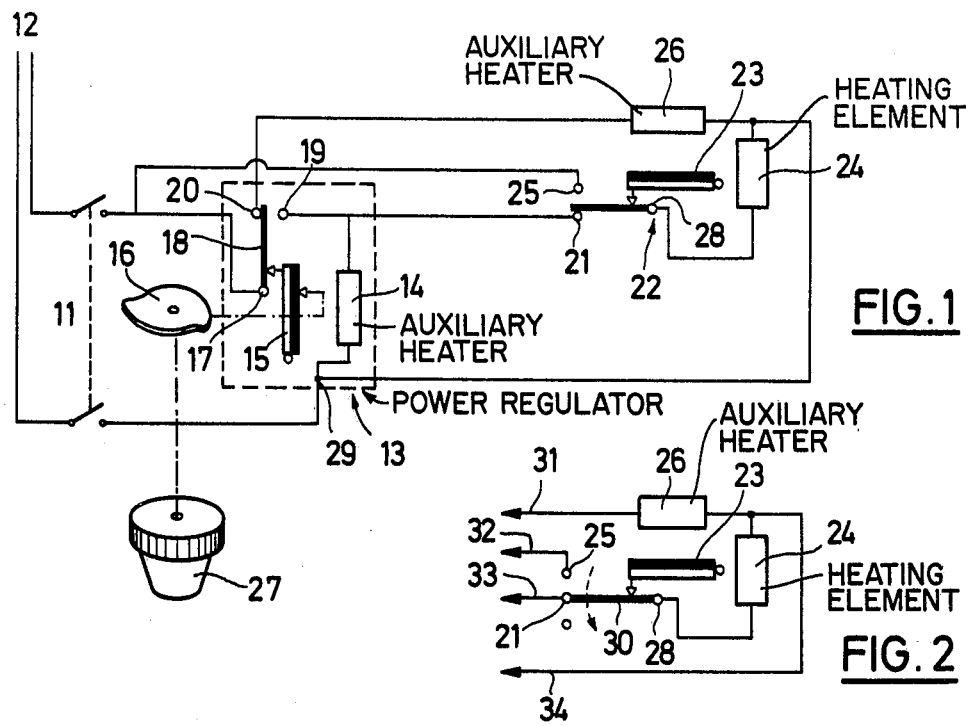
FIG. 1
FIG. 2
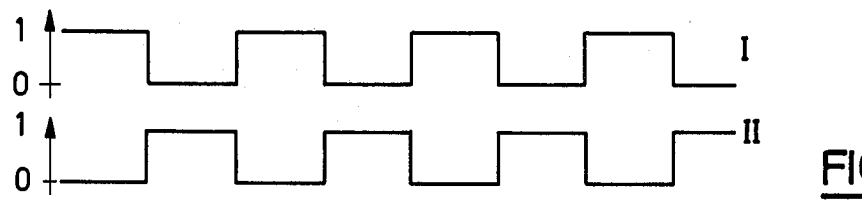
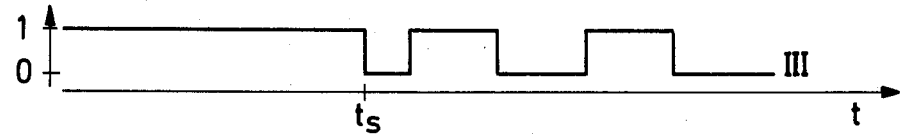
FIG. 3
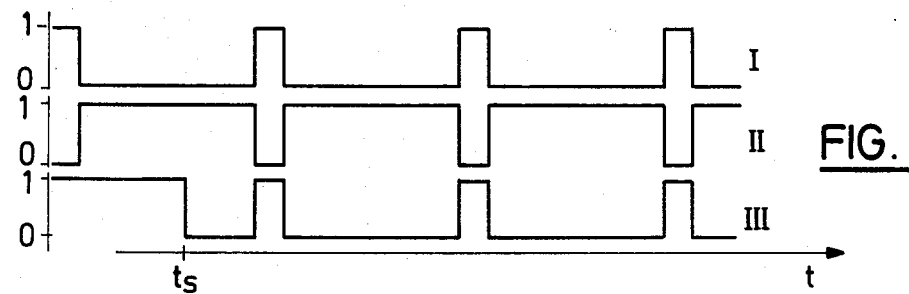
FIG. 4

CONTROL DEVICE FOR ELECTRIC HEATING APPARATUS

BACKGROUND OF THE INVENTION

The invention relates to a control device for electric heating apparatus with a power control device for the timed or periodic supply of electric power to the heating system of the heating apparatus. The heating apparatus is provided with a temperature sensor, as well as with a temperature switch actuated by the temperature sensor and which bridges the power control device until a given desired temperature is reached, and on reaching said temperature reduces the power supplied to the heating system.

Power control devices are also called power regulators.

It is already known in connection with electrical apparatus of the aforementioned type to use thermostatic regulators in the form of capillary tube regulators. In such regulators, there must be a mechanical connection, namely the capillary tube between the sensor and the regulator casing. However, it is desirable to only electrically connect the temperature sensor and regulator casing.

A control device of the aforementioned type is already known (German Pat. No. 2,557,194) in which there are two temperature-dependent switches, which in each case open the bridging of the switch connected to the power regulator on reaching a given desired temperature. There two temperature-dependent switches are connected in parallel and by means of a manually operable switch it is possible to select which of the two temperature-dependent switches is to function. Thus, it is only possible to set the control device manually to two different desired temperatures.

BRIEF SUMMARY OF THE INVENTION

The object of the invention is to provide a control device of the aforementioned type in which the desired temperature is continuously variable. This is to be achieved with minimum expenditure and effort.

According to the invention, this object is achieved by a regulating device of the aforementioned type in which, according to the invention, the temperature sensor can be heated by an auxiliary heating system. Whereas, in the known device, the heating of the temperature sensor only took place through that of the electrical apparatus, the invention now proposes providing an additional electrical heating system, the temperature sensor being heatable by the main electrical heating means, e.g. the hot plate and by the auxliary heating system. This can be achieved, for example, by arranging an additional electrical resistor in the immediate vicinity of the temperature sensor arranged close to the hotplate. By choosing the distance between the auxiliary heating system and the temperature sensor and by appropriate dimensioning of the electrical quantities of the auxiliary heating system, it is possible to ensure that in operation the temperature sensor has a temperature differing from that of the actual hotplate.

By selecting the aforementioned quantities, it is therefore possible to make the desired temperature of the hoptplate at which the power supply thereto is to be disconnected different from the fixed release temperature of the temperature switch. Thus, the object of the invention is achieved.

A particularly favourable possibility for varying the desired temperature is provided if, according to the invention, the timing switch of the power regulator is constructed as a changeover switch, whose changeover terminal is connected to the auxiliary heating system. Therefore, when the power regulator heating system is switched off, the auxiliary heating system of the temperature sensor is switched on. This means that a change in the timing conditions of the power regulator simultaneously leads to a change in the on-conditions of the auxiliary heating system. Thus, if the power regulator is set in such a way that less power is supplied to the hotplate, more power is simultaneously supplied to the auxiliary heating system, so that the temperature switch opens more rapidly, i.e. at lower temperature.

According to the invention, a particularly simple solution is provided if the temperature switch is an on-off switch which, on reaching the desired temperature, interrupts the power supplied to the electrical apparatus heating system.

However, it is particularly advantageous if the temperature switch is a changeover switch which, on reaching the desired temperature, connects the electrical apparatus heating system to the power regulator output. In this case, the heating system is supplied uninterruptedly with power until the desired temperature is reached, while on reaching the desired temperature the heating system is supplied with power via the power regulator.

According to a further embodiment, the invention proposes that the temperature switch is a combined changeover-cuttoff switch, which, on exceeding the desired temperature connects the electrical apparatus heating system of the power output and on exceeding a higher maximum temperature interrupts the power supplied to the heating system. This may be desirable for safety reasons. However, it is also possible to arrange a fixed-set safety contact in the load circuit.

It is particularly advantageous if the temperature switch is constructed as a double tumbler or snap switch, one part of which responds at a higher temperature than the other.

According to the invention, for varying the desired temperature of the electrical apparatus heating system, the switching-on time of the power regulator is variable in per se known manner. For example, this variability is brought about by a variable pre-tension of the expansion element of the power regulator. The variable pre-tension can, for example, be obtained by means of a cam plate.

It is particularly advantageous if the temperature sensor is constructed as a simple contact thermostat. In automatic hotplates, this contact thermostat can, for example, be located in the movable sensor of the hotplate.

BRIEF DESCRIPTION OF THE DRAWINGS

The invention is described in greater detail hereinafter relative to non-limitative embodiments and the attached drawings, wherein FIG. 1 is a circuit diagram of the control device according to the invention.

FIG. 2 is a modified embodiment of the temperature switch.

FIG. 3 illustrates the time dependence of the voltages at three different points of the circuit.

FIG. 4 is a representation corresponding to FIG. 3 with a different switching-on time of the power regulator.

DETAILED DESCRIPTION OF THE PREFERRED EMBODIMENTS

Figure 5:
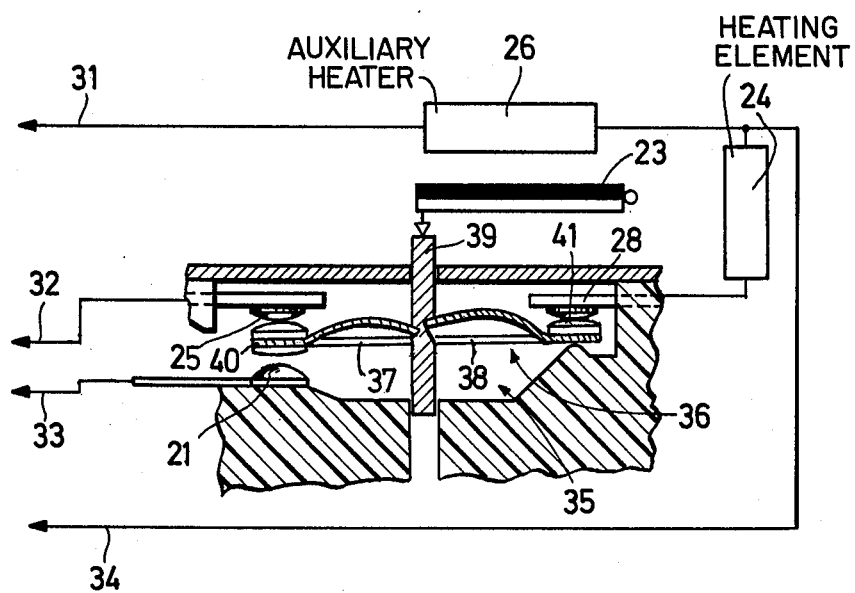
FIG. 5 is a further embodiment of the temperature switch.

The circuit shown in FIG. 1 is connected to a power source 12 by means of a two-pole master switch 11. The power regulator 13, shown in the dotted-line rectangle is connected in parallel with the power source and is shown here in the heated, i.e. open position. The power regulator 13 contains a heating system 14 in whose immediate vicinity is provided an expansion element 15. The expansion element 15, mechanically actuated by cam plate 16, acts mechanically on a switch 18, constructed as a changeover switch. FIG. 1 shows switch 18 with the expansion element 15 heated. The fixed contact 17 is connected to the secondary side of master switch 11.

One output 19 of switch 18, i.e. the output to which is applied the voltage at contact 17 when the expansion element 15 is cold is connected to one terminal 21 of a temperature switch 22 constructed as a changeover switch. Temperature switch 22 contains a temperature sensor 23, constructed as an expansion element. This temperature sensor acts mechanically on switch 22. It is positioned in the vicinity of the heating system 24 of the cooker. Thus, heat from the cooker heating system 24 heats the temperature sensor 23, so that the heat from heating system 24 leads to an actuation of switch 22. FIG. 1 shows switch 22 in the case of a heated temperature sensor 23.

Temperature switch 22 has a further input terminal 25, which is directly connected to the secondary side of master switch 11, i.e. with the fixed contact 17 of power regulator 13. When the temperature sensor 23 is cold, temperature switch 22 provides a connection between the secondary side of master switch 11 and heating system 24. This means that with the master switch 11 closed and a cold heating system 24, the latter is directly connected to the mains. In addition to the heating system 24 of the electrical heating apparatus, in the immediate vicinity of temperature sensor 23, a further auxiliary heating system 26 is provided, which is connected to output 20 of power regulator 13.

The cam plate 16 which serves to mechanically pretension the expansion element 15 of power regulator 13 is mechanically connected to a knob 27. Knob 27 is able to adjust the relationship of the switching-on time to the switching-off time of power regulator 13.

The control device according to the invention functions as follows. With the heating system cold, switch 11 is firstly closed. In this case, switch 18 is initially at output 19 and temperature switch 22 at input terminal 25. Thus, power is supplied to heating system 14 of power regulator 13 and heating system 24 of the electrical apparatus and as a result both heating systems are heated. As soon as switch 18 switches over to output 20, the auxiliary heating system 26 is heated, which leads to a greater heating of temperature sensor 23. When temperature sensor 23 reaches its desired value, temperature switch 22 switches over from input terminal 25 to input terminal 21, so that power is now supplied to heating system 24 from output 19 of power regulator 13.

The diagrams of FIGS. 3 and 4 show this effect again. Curve I shows the voltage at output 19 of power regulator 13, curve II the complementary voltage at output 20 of power regulator 13 and curve III the voltage applied to the output 28 of temperature switch 22. For reasons of simplicity, the voltages are standardized to 1. It is firstly clear that the voltages at outputs 19 and 20 of power regulator 13 are complementary to one another. In FIG. 3, it is assumed that the switching-on time of power regulator 13 to 50%, i.e. that the switching-on time and switching-off time of the power regulator are the same. After a certain time ts the temperature switch 22 switches over, so that its output 28 is now connected to output 19 of power regulator 13. As from this time, the voltage at output 28 of the temperature switch 22 follows the voltage at output 19 of temperature regulator 13.

FIG. 4 is a representation similar to that of FIG. 3, but in which the switching-on time of the power regulator is approximately 14%. Here again, curve II is complementary to curve I, which means that the auxiliary heating system 26 of temperature switch 22 is heated for a longer period, which leads to a more rapid response of temperature switch 22. This is apparent from curve III.

Thus, a change in the switching-on time of power regulator 13 also leads to a change in the desired temperature of the electrical apparatus heating system 24, although no interventions have taken place at temperature switch 22 or temperature sensor 23. Thus, the invention makes it possible to use a temperature switch 22 preset to a predetermined release temperature, to produce a continuously variable desired temperature of the heating system 24 of an electrical apparatus, for example a hotplate or oven. This is brought about solely by the relative switching-on time of the power regulator.

It is naturally also possible by means of a gang switch to in each case switch on only one of several auxiliary heating systems having in each case a different resistance, so that several desired temperatures are possible, while only using a single temperature switch.

FIG. 2 shows a modified embodiment of the temperature switch. The same reference numerals as in FIG. 2 are used for the same components. Line 31 is connected to output 20 of temperature regulator 13, line 32 to the fixed contact 17 of switch 18, line 33 to the output 19 of power regulator 13 and line 34 to point 29 of the circuit of FIG. 1.

The temperature switch 22 according to FIG. 2 is constructed as a changeover switch 30, a connection being produced between input terminal 25 and output 28 when temperature sensor 23 is cold. With rising temperature, there is a switchover to a connection between input terminal 21 and output 28. When the temperature rises further, changeover switch 30 is switched further in the direction indicated by the dotted-line arrow, so that it completely interrupts the power supply to the electrical apparatus heating system 24.

In the embodiment of the temperature switch according to FIG. 5, the latter is constructed as a double snap switch 35. It contains a double catch spring 36 shown in FIG. 5 with temperature sensor 23 cold. The left-hand half 37 of double catch spring 36 responds at a lower temperature than the righthand half 38. If the temperature sensor 23 is heated and presses on the axially displaceable rod 39, movable contact 40 of double snap spring 36 snaps over at a given temperature, so that it is now input 21 and not 25 which is connected to output 28. On further increasing the temperature, i.e. on moving rod 39 further downwards, the right-hand half 38 snaps over, so that the movable contact 41 is freed from output 28. This also brings about a switching off of heating system 24 on exceeding a maximum temperature.

Lines 31 to 34 in FIG. 5 correspond to lines 31 to 34 in FIG. 2 and are connected with the corresponding points of the circuit of FIG. 1.

The control device according to the invention has the major advantage that the power consumed in the additional auxiliary heating system neither leads to a disadvantageous increase in the temperature of the actual power control device or the master switch, nor is it unprofitably lost. Instead, the power consumed in the auxiliary heating system is largely used for heating purposes, e.g. the heating of the hotplate.

I claim:

1. A control device for the heating system of an electric heating apparatus comprising:
   a power regulator having a first temperature sensitive switch for periodically supplying electric power to the heating system;
   a second temperature sensitive switch connected for supplying unregulated power directly to the heating system in a first mode of operation until a given desired temperature is reached, and for supplying regulated power to the heating system from a first output of the regulator in a second mode of operation on reaching the desired temperature, reducing the power supplied to the heating system; and,
   an auxiliary heating system connected to a second output of the regulator and in thermal engagement with the second temperature sensitive switch, for hastening the onset of the second mode of operation.

2. A control device according to claim 1, wherein the first temperature sensitive switch is a changeover switch having a first terminal and a changeover terminal, the regulator outputs being the terminals of the changeover switch, the auxiliary heating system being connected to the changeover terminal, whereby the auxiliary heating system is powered by a regulated output complementary to the first output of the regulator at said first terminal, in both the first and second modes.

3. A control device according to claims 1 or 2, wherein the second temperature sensitive switch is an on-off switch which, on reaching the desired temperature, connects the first output of the power regulator to the heating system, thereby entering the second mode of operation.

4. A control device according to claims 1 or 2, wherein the second temperature sensitive switch is a changeover switch, a first position thereof connecting the heating system to the unregulated power and a changeover position thereof connecting the heating system to the first output of the power regulator on reaching the desired temperature.

5. A control device according to claims 1 or 2, wherein the second temperature sensitive switch is a combined changeover-cutoff switch having
   a first position connecting the electric heating system and the unregulated power, corresponding to the first mode of operation;
   a changeover position which, on exceeding the desired temperature, connects the electrical heating system to the first output of the power regulator, corresponding to the second mode of operation; and
   an over-temperature position which, on exceeding a maximum temperature, interrupts the power supplied to the electrical heating system, defining a third mode of operation.

6. A control device according to claim 5, wherein the second temperature dependent switch is a double snap switch, one half of which responds at a higher temperature than the other half.

7. A control device according to claim 1, further comprising means for varying the switching-on time of the power regulator.

8. A control device according to claim 1, wherein the temperature sensor is a contact thermostat.

9. A control device according to claims 1 or 2, wherein second temperature sensitive switch includes a temperature sensor and the auxiliary heating system is positioned in the immediate vicinity of the temperature sensor.

10. A control device according to claim 1, further comprising an expansion element in the power regulator, and a cam plate, rotatable about an axis, the cam plate acting on the expansion element of the power regulator, the position of the expansion element, and thereby the desired temperature, being varied by the rotation of the cam plate about its axis.

* * * * *

UNITED STATES PATENT AND TRADEMARK OFFICE
CERTIFICATE OF CORRECTION

PATENT NO. : 4,349,726

DATED : September 14, 1982

INVENTOR(S) : Gerhard Goessler

It is certified that error appears in the above-identified patent and that said Letters Patent are hereby corrected as shown below:

In the Abstract, line 1, delete "the timed" and insert --periodically supplying--.

In the Abstract, line 8, after "is" insert --periodically--.

In the Abstract, line 12, delete "(22)".

Column 1, line 32, delete "There" and insert --These--.

Column 1, line 65, delete "hoptplate" and insert --hotplate--.

Column 4, line 8, delete "to" and insert --is--.

Column 4, line 10, delete "ts" and insert --$t_s$--.

Signed and Sealed this

Eleventh Day of January 1983

[SEAL]

Attest:

GERALD J. MOSSINGHOFF

Attesting Officer

Commissioner of Patents and Trademarks